United States Patent
Xiao et al.

(10) Patent No.: US 8,989,016 B2
(45) Date of Patent: Mar. 24, 2015

(54) CELL SELECTION FOR MULTI-CELL MIMO TRANSMISSION

(71) Applicant: Fujitsu Limited, Kawasaki-shi, Kanagawa (JP)

(72) Inventors: Hui Xiao, Middlesex (GB); Luciano Sarperi, Bern (CH)

(73) Assignee: Fujitsu Limited, Kawasaki (JP)

( * ) Notice: Subject to any disclaimer, the term of this patent is extended or adjusted under 35 U.S.C. 154(b) by 242 days.

(21) Appl. No.: 13/622,102

(22) Filed: Sep. 18, 2012

(65) Prior Publication Data
US 2013/0044602 A1 Feb. 21, 2013

Related U.S. Application Data

(63) Continuation of application No. PCT/GB2010/000495, filed on Mar. 19, 2010.

(51) Int. Cl.
| | | |
|---|---|---|
| *H04L 1/00* | (2006.01) | |
| *H04B 7/02* | (2006.01) | |
| *H04L 5/00* | (2006.01) | |
| *H04L 25/02* | (2006.01) | |
| *H04W 48/20* | (2009.01) | |

(52) U.S. Cl.
CPC .............. *H04B 7/024* (2013.01); *H04L 5/0035* (2013.01); *H04L 25/0204* (2013.01); *H04L 25/0242* (2013.01); *H04W 48/20* (2013.01)
USPC ............................. 370/237; 370/329; 370/236

(58) Field of Classification Search
None
See application file for complete search history.

(56) References Cited

U.S. PATENT DOCUMENTS

| | | | | |
|---|---|---|---|---|
| 2006/0120477 | A1* | 6/2006 | Shen et al. | 375/267 |
| 2007/0223423 | A1* | 9/2007 | Kim et al. | 370/334 |
| 2008/0305818 | A1* | 12/2008 | Ko et al. | 455/509 |
| 2009/0130985 | A1* | 5/2009 | Lee et al. | 455/67.11 |
| 2009/0215480 | A1* | 8/2009 | Kim et al. | 455/501 |
| 2009/0296595 | A1* | 12/2009 | Khoshnevis et al. | 370/252 |
| 2009/0296635 | A1* | 12/2009 | Hui et al. | 370/328 |
| 2010/0034093 | A1* | 2/2010 | Roh | 370/241 |
| 2010/0195527 | A1* | 8/2010 | Gorokhov et al. | 370/252 |

(Continued)

FOREIGN PATENT DOCUMENTS

CN 101277166 A 10/2008

OTHER PUBLICATIONS

International Search Report issued for corresponding International Patent Application No. PCT/GB2010/000495, mailed Dec. 22, 2010.

(Continued)

*Primary Examiner* — Ian N Moore
*Assistant Examiner* — Phong La
(74) *Attorney, Agent, or Firm* — Myers Wolin, LLC

(57) ABSTRACT

A method for use in selecting a cell or cells, from amongst a set of cells in a cellular wireless network, for coordinated use in multi-cell multiple-input/multiple-output (MIMO) transmission so as to reduce feedback overhead, each cell of the said set having at least one MIMO channel characteristic which may vary with time at a measurable rate, comprises a cell selection process comprising the steps of: identifying a cell or subset of cells of the said set for which the time variation rate/rates of the said MIMO channel characteristic is/are the slowest of those of the cells in the said set; and selecting a cell or cells for use in multi-cell MIMO transmission from only the cell or subset of cells identified in the identifying step.

34 Claims, 8 Drawing Sheets

(56) References Cited

U.S. PATENT DOCUMENTS

| | | | |
|---|---|---|---|
| 2010/0202308 A1* | 8/2010 | Gorokhov et al. | 370/252 |
| 2010/0202391 A1* | 8/2010 | Palanki et al. | 370/329 |
| 2010/0238821 A1* | 9/2010 | Liu et al. | 370/252 |
| 2011/0171955 A1* | 7/2011 | Acharya | 455/434 |
| 2011/0200131 A1* | 8/2011 | Gao et al. | 375/267 |
| 2011/0319092 A1* | 12/2011 | Kim et al. | 455/452.1 |
| 2012/0087335 A1* | 4/2012 | Baligh et al. | 370/330 |

OTHER PUBLICATIONS

Xinying Gao et al; "Low-complexity Downlink Coordination Scheme for Multi-user CoMP in LTE-Advanced System" IEEE 2009, pp. 355-359, XP002613590, 20th International Symposium on Personal, Indoor and Mobile Radio Communications (PIMRC 2009) Piscataway, NJ USA.

Hitachi Ltd.; "Consideration on Feedback for Adaptive Cell Clustering", 3GPP Draft; R1-100172, vol. RAN WG1, Jan. 22, 2010 pp. 1-6, XP050418414, Valencia, Spain, p. 2-3.

LG Electronics; "CQI Contents & Measurement for CoMP"; 3GPP TSG-RAN WG1 Meeting #58bis; R1-094177; Agenda Item 7.5; Miyazaki, Japan; Oct. 12, 2009-Oct. 16, 2009.

Office Action issued for corresponding Chinese Patent Application No. 201080065592.5, dated Jun. 25, 2014, with an English translation.

* cited by examiner

CELL SELECTION FOR MULTI-CELL MIMO TRANSMISSION

CROSS-REFERENCE TO RELATED APPLICATIONS

This is a continuation of International Patent Application No. PCT/GB2010/000495, filed Mar. 19, 2010, now pending, the contents of which are herein wholly incorporated by reference.

FIELD OF THE INVENTION

The present invention relates to cell selection for multi-cell MIMO (multiple-input/multiple-output) transmission in a cellular wireless network, in particular, but not exclusively, a 3GPP LTE-A network.

BACKGROUND

Wireless communication systems are widely known in which a base station communicates with multiple subscriber stations or users within range of the base station. The area covered by one base station is called a cell and, typically, many base stations are provided in appropriate locations so as to cover a wide geographical area more or less seamlessly with adjacent cells. In conventional such cellular wireless networks the equipment of each user ("user equipment" or "UE") is only served by one base station (BS) at a time. However, this can result in low cell-edge data rates and coverage owing to high inter-cell interference at the cell-edge. To reduce the cell-edge interference it is beneficial to serve a cell UE by multiple base stations; this is termed "multi-cell multiple-input/multiple-output" or "multi-cell MIMO". By using multi-cell MIMO the harmful interference from neighbouring cells can be turned into useful signals, thereby improving cell-edge throughput, system throughput and coverage.

However, coordinating the multiple-input multiple-output (MIMO) transmissions among multiple base stations requires channel knowledge and data information to be shared among the coordinated base stations, resulting in additional requirements on the backhaul capabilities. Furthermore, for FDD systems, the channel knowledge is mainly obtained by UE feedback. Since multiple cells participate in the coordinated transmission, the amount of channel knowledge needed at the network side increases linearly with the number of cooperating cells, which will be a heavy burden for the uplink channel. Therefore, in practice, in order to relax the backhaul burden and improve the efficiency of cooperative multi-cell transmission, it is usually better to use only some of the cells which could potentially be used to cooperatively serve UEs on a given time-frequency resource. In such a case, it is necessary to determine which of the cells have priority, over the other cells, to be used cooperatively to serve a given UE.

As an example, FIG. 1 of the accompanying drawings illustrates an application scenario of a cell grouping method based on the terminology and definitions given by LTE-A (see R1-092290, "TP for feedback in support of DL CoMP for LTE-A TR", Qualcomm Europe, 3GPP TSG-RAN WG1 #57, 4-8 May, 2009, San Francisco, USA). It should be noted that the LTE-A system serves purely as an example and the invention could be applied to any other multi-cell MIMO system.

The 3GPP standardisation body has identified coordinated multi-point transmission/reception (CoMP) as a key technology that is included in the LTE-A study item to improve the coverage of high data rates, the cell-edge throughput and/or to increase system throughput. Essentially CoMP is a coordinated multi-cell MIMO transmission/reception scheme, and, according to 3GPP TR 36.814 "Further Advancements for E-UTRA Physical Layer Aspects (Release 9)", V1.0.0, 2009-02-26, its downlink scheme is mainly characterized into two categories, termed "Coordinated scheduling and/or beamforming (CS/CB)" and "Joint Processing/Transmission (JP/JT)".

In the category of CS/CB, "data to a single UE is instantaneously transmitted from one transmission point, but user scheduling/beamforming decisions are made with coordination among cells corresponding to the CoMP cooperating set", while in the category of JP, "data to a single UE is simultaneously transmitted from multiple transmission points to (coherently or non-coherently) improve the received signal quality and/or cancel interference for other UEs".

In the example of FIG. 1, it is assumed that cells A, B and C actively transmit to a UE (termed CoMP Transmission Points), while cell D is not transmitting during the transmission interval used by cells A, B and C. The set of cells A, B, C and D is termed a "CoMP Cooperating Set". They can be selected by using some selection principles based on the measurements provided by the cells in the measurement set. For example, recently some cell selection methods were proposed to configure the CoMP cooperating set based on the RSRP measurements of the cells in the measurement set (see R1-092833, "Discussions on CoMP cooperating set", CHTTL, 3GPP TSG-RAN WG1 #57bis, 29 Jun.-3 Jul., 2009, Los Angeles, USA and PCT/EP2009/006572 filed on 10 Sep., 2009). In order to obtain certain target transmission gains by using CoMP (e.g. target signal to interference plus noise ratio (SINR), target transmission data rate), some of the cells of the CoMP cooperating set are grouped together to carry out certain cooperative transmission. For example, if cell B is assumed to be the serving cell of a given UE since it can provide the highest average received signal power, and additionally if either cell A or cell C can be grouped with cell B to meet the target transmission data rate, in such a case it is beneficial to have a criterion to decide which cell has the priority to be grouped with cell B, because properly grouping cells that potentially carry out cooperative transmissions can help reduce the feedback overhead needed during the coordinated transmissions, which is a significant problem encountered by CoMP for the uplink channel.

It should be noted that CoMP may not be suitable for high mobility scenarios, such as where the velocity of the UE is ≥120 km/h, since high performance CoMP solutions are very sensitive to channel information being outdated (see R1-084322, "Scalable CoMP solutions for LTE advanced", Nokia Siemens Networks, Nokia, 3GPP TSG-RAN WG1 #55, 10-14 November, Prague, Czech Republic) and the requirement on feedback is too difficult to be satisfied (see also R1-092309, "High-level principles for CSI feedback for DL MIMO and CoMP in LTE-A", Alcatel-Lucent, Philips, Qualcomm, 3GPP TSG-RAN WG1 #57bis, 29 Jun.-3 Jul., 2009, Los Angeles, USA). Therefore, in the following, it is assumed that CoMP is intended for low mobility and medium mobility scenarios.

In the paper by A. Papadogiannis, D. Gesbert and E. Hardouin, "A dynamic clustering approach in wireless networks with multi-cell cooperative processing", Proceedings of the IEEE international conference on communications, 2008 (ICC 2008), a dynamic cell clustering approach is proposed to form clusters of cooperating BSs for multi-cell cooperative processing (MCP). The clustering approach in this article is based on the sum-capacity maximization criterion, and the clusters can be dynamically formed in order to maximize the joint capacity of all the UEs within each cluster.

In the paper by X. Gao, A. Li, H. Kayama, "Low complexity downlink coordination scheme for multi-user CoMP in LTE-Advanced system", Proceedings of the IEEE international symposium on personal, indoor and mobile radio communications, 2009 (PIMRC 2009), a method that can divide the cooperating set into best groups of transmission points and coordinated UEs is proposed for downlink CoMP MU-MIMO. Since it uses the large-scale channel information rather than the short-term channel information for CoMP MU-MIMO precoding and for grouping transmission points and UEs, the feedback overhead can be decreased during the operation of CoMP.

In the paper by M. Kamoun and L. Mazet, "Base-station selection in cooperative single frequency cellular network", Proceedings of the IEEE workshop on signal processing advances in wireless communications, 2007 (SPAWC 2007), a BS selection algorithm is disclosed to be used in the context of uplink cooperative single frequency cellular network. In order to relax the fixed network load, a small number of BSs that can best decode the data for a given UE are selected based on the criterion of maximizing the uplink capacity of the given UE.

In a method proposed in the paper by S. Venkatesan, "Coordinating base stations for greater uplink spectral efficiency in a cellular network", in proceedings of the IEEE international symposium on personal, indoor and mobile radio communications, 2007 (PIMRC 2007), a static clustering of BSs is used to prove the significant improvement in uplink spectral efficiency by coordinating BSs in reception of data from UEs. The cooperation clusters are static, and each UE is assigned to a certain cluster by using the highest SINR principle.

CN101389115A presents a method that can divide all base stations into base station clusters including fewer base stations, and executing collaborative communication between base stations in the same cluster. The selection of base stations by each UE and the allocation of UEs into each base station cluster are both according to strength of the pilot signal to ensure accurate communication between the collaborative base stations and the customers.

WO2009061660A discusses a method for selecting relay stations to perform either cooperative or non-cooperative communication with a UE. The selection of relay stations is based on threshold values using outage or throughput constraints, applied to both the base station to the relay station and the relay station to UE links.

Furthermore, in US2008247478A a method to select a reference relay station and a cooperative relay station among a plurality of relay stations is disclosed. The selection of the relay stations is based on location information of the UE and average CQI information. The information is sent from the relay stations to the base stations using a search request message.

It is therefore desirable to provide a method and apparatus which can help determine the active cells to join the coordination based on the criterion of reducing the feedback overhead needed during the operation of coordinated multi-cell transmissions.

BRIEF SUMMARY

According to an embodiment of a first aspect of the present invention there is provided a method for use in selecting a cell or cells, from amongst a set of cells in a cellular wireless network, for coordinated use in multi-cell multiple-input/multiple-output (MIMO) transmission so as to reduce feedback overhead, each cell of the said set having at least one MIMO channel characteristic which may vary with time at a measurable rate, the method comprising a cell selection process comprising the steps of: identifying a cell or subset of cells of the said set for which the time variation rate/rates of the said MIMO channel characteristic is/are the slowest of those of the cells in the said set; and selecting a cell or cells for use in multi-cell MIMO transmission from only the cell or subset of cells identified in the identifying step.

Preferably, the method further comprises carrying out a preselection process before the identifying step, in which process cells of the network are preselected for inclusion in the said set of cells if signals received from the cells at a specific receiver are consistent with achieving a target coordination gain.

Such a method may also comprise carrying out, after the passage of an interval from selection of the cell or cells for use in the multi-cell MIMO transmission in the selecting step of the immediately-preceding cell selection process, an updating process comprising: determining whether the time variation rate/rates of the MIMO channel characteristic for a cell or any of the cells selected in the preceding cell selection process have changed by a preselected amount from the time variation rate/rates used in the preceding cell selection process for that cell or those cells; if such a change is determined to have occurred, repeating the said preselection process; and, if a set of cells can be preselected in the preselection process, repeating the cell selection process or a different cell selection process.

Alternatively, the method may further comprise, where a subset of cells is identified in the identifying step, in the selecting step selecting that cell or those cells of the said subset for use in multi-cell MIMO transmission for which signals received from the cell or cells at a specific receiver are consistent with achieving a target coordination gain.

Such a method may also comprise carrying out, after the passage of an interval from selection of the cell or cells for use in the multi-cell MIMO transmission in the selecting step of the immediately-preceding cell selection process, an updating process of determining whether the time variation rate/rates of the MIMO channel characteristic for a cell or any of the cells selected in the preceding cell selection process have changed by a preselected amount from the time variation rate/rates used in the preceding cell selection process for that cell or those cells, and, if such a change is determined to have occurred, repeating the cell selection process or a different cell selection process.

According to an embodiment of a second aspect of the present invention there is provided a method for use in selecting a cell or cells, from amongst a set of cells in a cellular wireless network, for coordinated use in multi-cell multiple-input/multiple-output (MIMO) transmission so as to reduce feedback overhead, each cell of the said set having at least one MIMO channel characteristic which may vary with time at a measurable rate, the method comprising a cell selection process comprising the steps of: determining, for each cell in the said set, a metric which is dependent upon at least first and second parameters, the metric being high when the value of the first parameter is low and the value of the second parameter is high, the first parameter being the rate of variation with time of at least one MIMO channel characteristic of the cell concerned and the second parameter relating to a characteristic of signals received from the cell at a specific receiver; identifying a cell or subset of cells of the said set for which the metric/metrics is/are highest of all the metrics determined for the cells of the said set; and selecting a cell or cells for use in multi-cell MIMO transmission from only the cell or subset of cells identified in the identifying step.

Such a method may also comprise carrying out, after the passage of an interval from selection of the cell or cells for use in the multi-cell MIMO transmission in the selecting step of the immediately-preceding cell selection process, an updating process of determining whether the time variation rate/rates of the MIMO channel characteristic for a cell or any of the cells selected in the preceding cell selection process have changed by a preselected amount from the time variation rate/rates used in the preceding cell selection process for that cell or those cells, and, if such a change is determined to have occurred, repeating the cell selection process or a different cell selection process.

According to an embodiment of a third aspect of the present invention there is provided apparatus for use in a communication system for a cellular wireless network, the apparatus being operable to carry out a cell selection process for use in selecting a cell or cells, from amongst a set of cells in the cellular wireless network, for coordinated use in multi-cell multiple-input/multiple-output (MIMO) transmission so as to reduce feedback overhead, each cell of the said set having at least one MIMO channel characteristic which may vary with time at a measurable rate, the cell selection process being carried out by cell selection means of the apparatus having: identifying means operable to identify a cell or subset of cells of the said set for which the time variation rate/rates of the said MIMO channel characteristic is/are the slowest of those of the cells in the said set; and selecting means operable to select a cell or cells for use in multi-cell MIMO transmission from only the cell or subset of cells identified by the identifying means.

Preferably the apparatus further comprises preselection means operable to preselect cells of the network for inclusion in the said set of cells if signals received from the cells at a specific receiver are consistent with achieving a target coordination gain.

Such apparatus may further comprise change determining means operable, after the passage of an interval from the immediately-preceding selection of the cell or cells for use in the multi-cell MIMO transmission, to determine whether the time variation rate/rates of the MIMO channel characteristic for a cell or any of the cells selected in the immediately-preceding cell selection process have changed by a preselected amount from the time variation rate/rates used in the preceding cell selection process for that cell or those cells, and, if such a change is determined to have occurred and a set of cells can be preselected by the preselection means, cause the cell selection process or a different cell selection process to be repeated.

Alternatively, the selecting means may be operable, where a subset of cells is identified by the identifying means, to select that cell or those cells of the said subset for use in multi-cell MIMO transmission for which signals received from the cell or cells at a specific receiver are consistent with achieving a target coordination gain.

Such apparatus preferably further comprises change determining means operable, after the passage of an interval from the immediately-preceding selection of the cell or cells for use in the multi-cell MIMO transmission, to determine whether the time variation rate/rates of the MIMO channel characteristic for a cell or any of the cells selected in the immediately-preceding cell selection process have changed by a preselected amount from the time variation rate/rates used in the preceding cell selection process for that cell or those cells, and, if such a change is determined to have occurred, cause the cell selection process or a different cell selection process to be repeated.

According to an embodiment of a fourth aspect of the present invention there is provided apparatus for use in a communication system for a cellular wireless network, the system being operable to carry out a cell selection process for use in selecting a cell or cells, from amongst a set of cells in the cellular wireless network, for coordinated use in multi-cell multiple-input/multiple-output (MIMO) transmission so as to reduce feedback overhead, each cell of the said set having at least one MIMO channel characteristic which may vary with time at a measurable rate, the cell selection process being carried out by cell selection means of the apparatus having: metric determining means for determining, for each cell in the said set, a metric which is dependent upon at least first and second parameters, the metric being high when the value of the first parameter is low and the value of the second parameter is high, the first parameter being the rate of variation with time of at least one MIMO channel characteristic of the cell concerned and the second parameter relating to a characteristic of signals received from the cell at a specific receiver; identifying means for identifying a cell or subset of cells of the said set for which the metric/metrics is/are highest of all the metrics determined for the cells of the said set; and selecting means for selecting a cell or cells for use in multi-cell MIMO transmission from only the cell or subset of cells identified by the identifying means.

The apparatus preferably further comprises change determining means operable, after the passage of an interval from the immediately-preceding selection of the cell or cells for use in the multi-cell MIMO transmission, to determine whether the time variation rate/rates of the MIMO channel characteristic for a cell or any of the cells selected in the immediately-preceding cell selection process have changed by a preselected amount from the time variation rate/rates used in the preceding cell selection process for that cell or those cells, and, if such a change is determined to have occurred, cause the cell selection process or a different cell selection process to be repeated.

In the above-mentioned method and apparatus, the characteristic to which the said second parameter relates is desirably a factor in achieving a target coordination gain, for example SINR, transmission data rate, etc.

According to an embodiment of a fifth aspect of the present invention there is provided a communication system for a cellular wireless network, comprising apparatus embodying the third or fourth aspects of the present invention.

The system may further comprise user equipment operable to supply to the apparatus data indicative of the time variation rate/rates of the MIMO channel characteristic for at least the cell/cells in the said set.

The user equipment may be operable to supply the said data to the apparatus in response to a trigger from the apparatus.

It may be desirable for the user equipment to supply the said data to the apparatus at periodic intervals. When the user equipment is operable to supply the said data to the apparatus in response to a trigger from the apparatus, the apparatus may be operable to notify the user equipment of the periodicity of the intervals at which the said data is to be supplied when providing the said trigger.

The user equipment may be operable, also or instead, to supply the said data to the apparatus when the time variation rate of the MIMO channel characteristic for the cell, or at least one of the cells, in the said set reaches a predefined threshold value.

According to an embodiment of a sixth aspect of the present invention there is provided a computer program which, when executed in apparatus of a cellular wireless network, is operable to carry out a method according to the first or second aspects of the present invention.

In the aforementioned aspects of the present invention, the cellular wireless network may be a 3GPP network.

In order to perform coordinated multi-cell MIMO transmissions, an embodiment of the present invention provides a method that can help determine the active cells to join the coordination with the serving cell, based on the criterion of reducing the feedback overhead needed during the operation of coordinated multi-cell MIMO transmissions. Assuming that there exist multiple cells that can provide a certain coordination gain, a method embodying the present invention aids selection by identifying the cell or cells with slower time-varying MIMO channels among the multiple choices, since the feedback rate of channel information during the operation of coordinated multi-cell MIMO transmissions can be reduced by using the cell or cells that has/have slower time-varying channels.

A method embodying the present invention can be applied to various multi-cell MIMO transmission modes to reduce feedback overhead during the operation of coordinated multi-cell MIMO transmissions (typically by around 50%).

BRIEF DESCRIPTION OF THE DRAWINGS

Reference will now be made, by way of example, to the accompanying drawings, in which.

DETAILED DESCRIPTION

Figure 1:
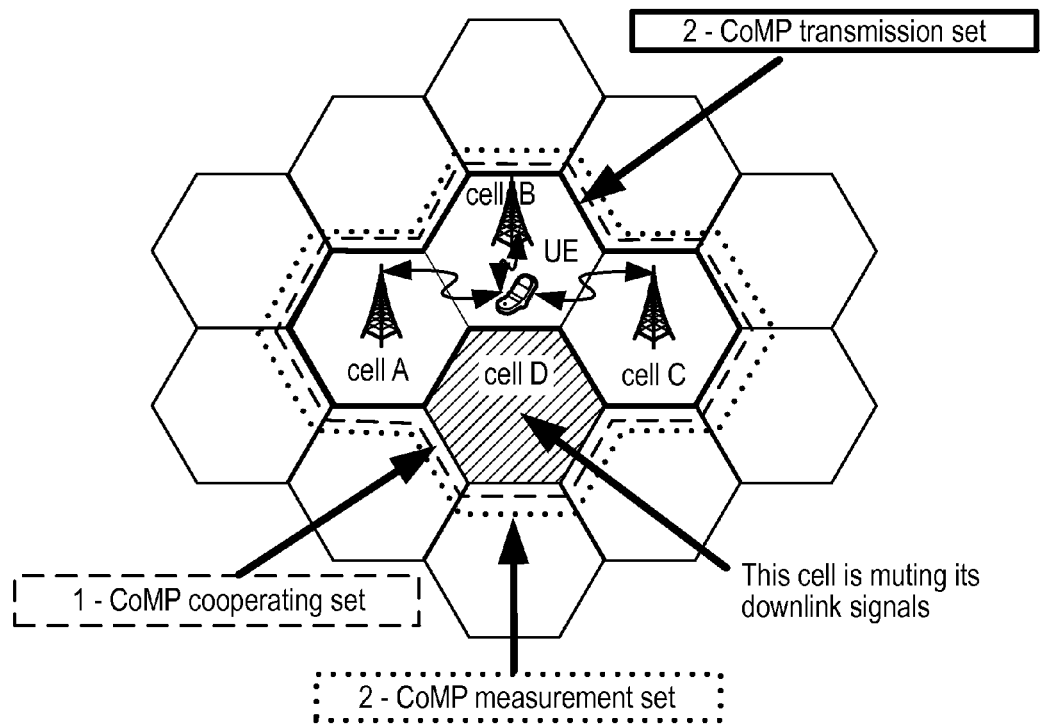
FIG. 1 (described above) illustrates multi-cell MIMO cell sets in 3GPP LTE-A.

As mentioned above, during the operation of CoMP, the UE has to report detailed channel measurements such as channel state/statistical information or narrow band SINR for the cells that carry out cooperative transmissions, in order to perform precoder design, link adaptation and scheduling at the base stations (see R1-091936, "Spatial correlation feedback to support LTE-A MU-MIMO and CoMP: system operation and performance results", Motorola, 3GPP TSG-RAN WG1 #57, 4-8 May, 2009, San Francisco, USA, R1-092634, "CoMP operation based on spatial covariance feedback and performance results of coordinated SU/MU beamforming", Motorola, 3GPP TSG-RAN WG1 #57bis, 29 Jun.-3 Jul., 2009, Los Angeles, USA, and R1-091282, "Adaptive codebook designs for MU-MIMO", Huawei, 3GPP TSG-RAN WG1 #56bis, 23-27 Mar., 2009, Seoul, Republic of Korea). For FDD systems, the amount of channel information needed to be fed back increases linearly with the number of cooperating cells, which will be a heavy burden for the uplink channel.

In order to reduce the feedback overhead needed during the operation of CoMP, an embodiment of the present invention provides a method that can help determine the cells that are active to join the coordination with the serving cell, by selecting the cell or cells which has/have slower time-varying MIMO channels to be grouped with the serving cell to carry out cooperative transmissions to the UE if there exist multiple cells that are able to provide a certain CoMP gain.

The assumption is that there exist multiple cells that can provide a certain coordination gain, so that the proposed method can help select the cells with slower time-varying MIMO channels among the multiple choices of cell in order to reduce the feedback rate during the operation of coordinated multi-cell MIMO. Therefore, the proposed method is preferably applied after an initial preselection or evaluation procedure that checks whether or not there exist multiple cells to meet a certain target coordination gain. Alternatively, the evaluation procedure can be carried out after the cells with slower time-varying channels have been identified, or the proposed cell grouping method and the evaluation procedure can be applied jointly to make the grouping decision. The working principle of the evaluation procedure varies depending on what kind of coordination gain is of interest (e.g. target SINR, target transmission data rate, etc.), which will not be discussed in great detail in this application as it will be appreciated that there are many different possibilities. However, in order to explain more clearly how an embodiment of the proposed cell grouping method can be applied, in the next section the power principle proposed in PCT/EP2009/006572 is adopted, as an example only, in the evaluation procedure to check whether there exist multiple cells that can provide a certain signal to interference ratio (SIR) gain. Based on the employment of the example evaluation procedure, a cell grouping method that can help reduce the feedback overhead needed during the operation of coordinated multi-cell MIMO will be described in detail.

A method embodying the present invention comprises a cell selection process comprising the steps of identifying a cell or subset of cells of the said set for which the time variation rate/rates of the said MIMO channel characteristic is/are the slowest of those of the cells in the said set, and selecting a cell or cells for use in multi-cell MIMO transmission from only the cell or subset of cells identified in the identifying step.

Taking the scenario illustrated in FIG. 1 as an example and assuming the percentages of the long-term average received signal power by a given UE from cells A, B, C, D and the other cells in the measurement set are 25%, 35%, 25%, 10% and 5% respectively, by using the power principle proposed in PCT/EP2009/006572 the set of cells A, B, C and D is configured as the CoMP cooperating set since these cells together provide dominant received power, and cell B is the serving cell since it can provide the highest average received signal power. In this example, the target SIR is assumed to be 1.5, and it can be found, when carrying out the evaluation procedure, that by grouping cell B with either cell A or cell C to perform cooperative transmissions to a given UE, the target SIR can be met since the resulted SIRs are both 1.7. In other words, the results of the evaluation procedure show that there exist two candidate cells, i.e. cell A and cell C, which can be grouped with cell B to perform cooperative transmissions to a given UE to meet the target SIR. In this embodiment, the proposed cell grouping method is selected so as to give the cell(s) which can provide slower time-varying MIMO channels higher priority to be grouped with cell B. The rationale behind the proposed grouping method is that the feedback rate of channel information during the operation of CoMP can be reduced by using the cell that has slower time-varying channels. To assist the BS in judging the priority of the cells that can be grouped with cell B, time variation indicators (TVI) (that is, information that can indicate the time variation rate of the MIMO channels in terms of various MIMO channel properties, for example, the spatial structure of MIMO channels, channel quality indicator (CQI) of MIMO channels, etc.) for the potentially cooperating cells are measured and reported by the UE to the BS. If the TVI of cell A denotes it as a slowly time-varying cell, and that of cell C represents a fast time-varying cell, then cell A is chosen to be grouped with cell B; if the TVIs of cell A and cell C are identical, then either cell A or cell C can be selected to be grouped with cell B for the cooperative transmissions.

Preferably, a cell selection scheme embodying the present invention further comprises carrying out a preselection process before the identifying step, in which process cells of the network are preselected for inclusion in the said set of cells if signals received from the cells at a specific receiver are consistent with achieving the said target coordination gain. The preselection process may be carried out before the identifying step of each cell selection process, or only once, before the first cell selection process, and not repeated for each subsequent cell selection process. In the example above, the proposed cell grouping method is applied after cells are preselected using a CoMP gain evaluation procedure, but a different cell selection scheme may be desirable in which the evaluation procedure is carried out after carrying out the proposed cell grouping method. Alternatively, the cell grouping decision can be made using a criterion that is the weighted combination of the criterion used for the CoMP gain evaluation procedure and the proposed cell grouping method. In this case, a cell selection scheme embodying the present invention comprises a cell selection process comprising, firstly, determining, for each cell in the said set, a metric which is dependent upon at least first and second parameters, the metric being high when the value of the first parameter is low and the value of the second parameter is high, the first parameter being the rate of variation with time of at least one MIMO channel characteristic of the cell concerned and the second parameter relating to a characteristic of signals received from the cell at a specific receiver. Secondly, a cell or subset of cells of the said set is identified for which the metric/metrics is/are highest of all the metrics determined for the cells of the said set. Then, a cell or cells for use in multi-cell MIMO transmission is selected from only the cell or subset of cells identified in the identifying step. The characteristic to which the said second parameter relates is desirably a factor in achieving a target coordination gain.

Preferably, a method embodying the present invention further comprises carrying out, after the passage of an interval from selection of the cell or cells for use in the multi-cell MIMO transmission in the selecting step of the immediately-preceding cell selection process, the step of determining whether the time variation rate/rates of the MIMO channel characteristic for a cell or any of the cells selected in the said selecting step have changed by a preselected amount from the time variation rate/rates for that cell or those cells used in the preceding cell selection process, and, if such a change is determined to have occurred, repeating the cell selection process.

In other words, in terms of the above example, if the TVIs of the potentially cooperating cells are periodically reported by the UE to the BS, and if the time variation conditions of cell A and cell C have changed, the BS can dynamically change the grouping choice for cell B provided that cell A and cell C are still both eligible to provide the required CoMP gain.

In this case the UE is operable to supply to the BS data indicative of the time variation rate/rates of the MIMO channel characteristic for at least the cell/cells in the said set. This may be done in response to a trigger from the BS, so that BS controls reporting of the time variation rate/rates of the MIMO channel characteristics by the UE. This trigger may be implicit signalling by the BS, for example when the UE is triggered to perform the CoMP operation, or explicit signalling.

The UE may be operable to supply the said data to the apparatus at periodic intervals, for example with a periodicity notified to the UE by the BS when the BS is providing the trigger, and/or aperiodically, for example when the measured time variation rate of the MIMO channel characteristic for the cell, or at least one of the cells, in the said set reaches a predefined threshold value, indicating that the MIMO channel characteristic of that cell is varying more quickly than desirable.

Figure 2:
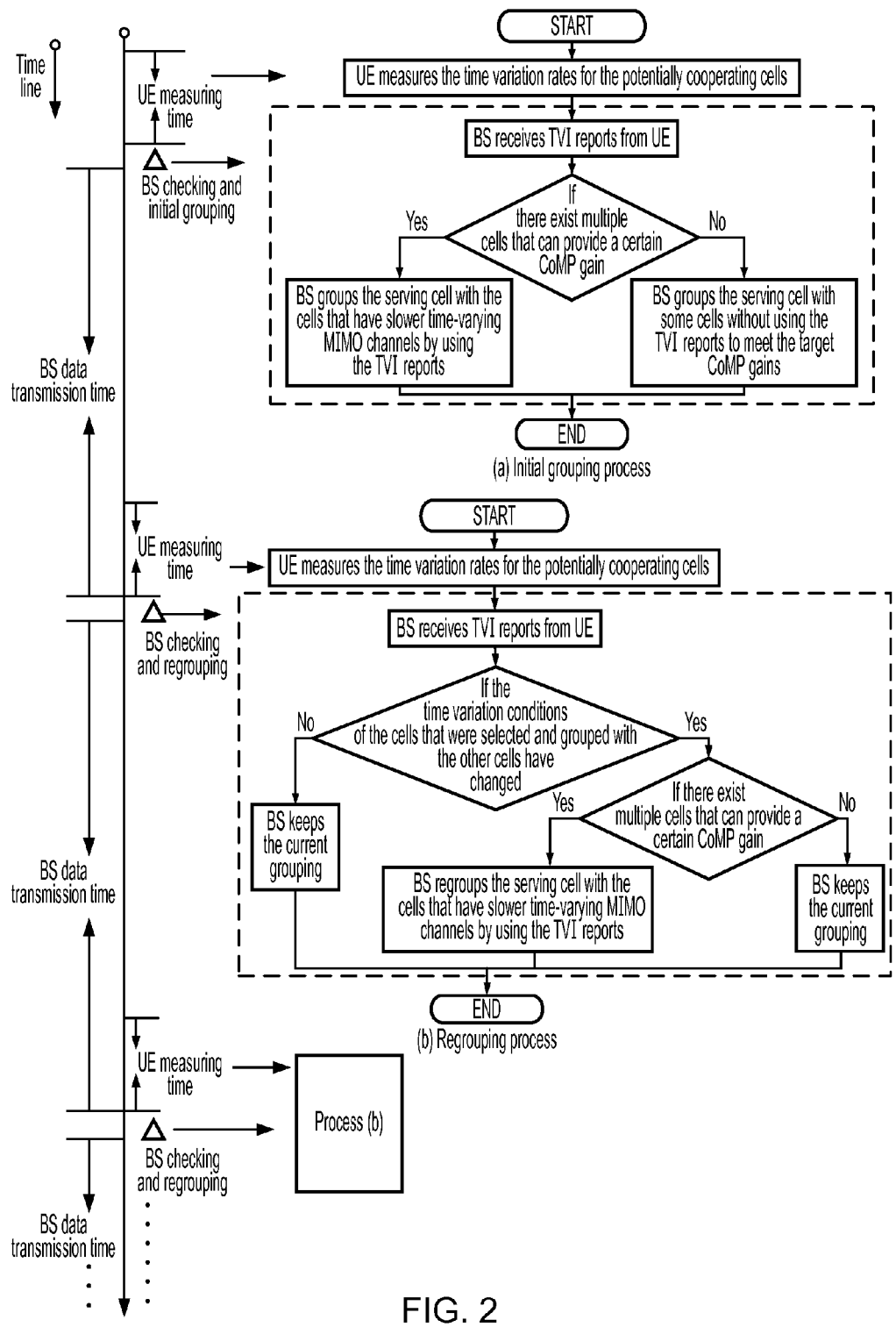
FIG. 2 is a flowchart illustrating a method embodying a first aspect of the present invention.

A flowchart illustrating processes of a dynamic cell grouping (DCG) method embodying the present invention is shown in FIG. 2, the DCG method in this case being carried out after preselection of cells using a CoMP gain evaluation procedure. In FIG. 2, the time line on the left-hand side shows the sequence of events, which includes measuring TVIs by the UE, checking and cell initial grouping/regrouping at the BS and BS data transmission. On the right-hand side of FIG. 2, corresponding to the time line, the part identified as FIG. 2(*a*) illustrates the detailed process performed during the UE measuring and BS checking and initial grouping time period, and the part identified as FIG. 2(*b*) illustrates the detailed process during the UE measuring and BS checking and regrouping time period. In this embodiment there is a difference in the checking process carried out for the BS initial grouping process and for the BS regrouping process. For the BS initial grouping process, the BS checking process only need evaluate whether there exist multiple cells that can provide a certain CoMP gain, while for the BS regrouping process, the BS need evaluate two aspects, which are whether the time variation conditions of the cells that were selected have changed, and if so whether there exist multiple cells that can provide a certain CoMP gain. In the embodiment illustrated by FIG. 2, except for the initial UE measuring and BS checking and grouping time period, the process given by FIG. 2(*b*) is repeatedly applied during the UE measuring and BS checking and regrouping time periods.

To summarize, the proposed DCG method shown in FIG. 2 includes the following aspects:

(1) the TVIs of the potentially cooperating cells are periodically measured and reported by the UE to the BS;

(2) if there exist multiple cells that can provide a certain CoMP gain, then the cell(s) which can provide slower time-varying MIMO channels have the priority to be chosen for grouping with the serving cell; alternatively (although not shown in FIG. 2) the cells having slower time-varying MIMO channels can be identified before determining which of the cells can provide the required CoMP gain, or the weighted combination of the CoMP gain evaluation criterion and the proposed DCG method can be used to group the cells that are active for coordination; and (3) the grouping can be dynamically controlled at the BS by using the periodical TVI reports for the potentially cooperating cells.

As mentioned above there are various possible cell selection schemes. The method shown in FIG. 2 employs the same cell selection scheme for the initial grouping of cells and for the regrouping, but it is possible to use combinations of two or more different cell selection schemes for the first occurrence of the cell selection process and subsequent repetitions thereof.

Figure 9A:
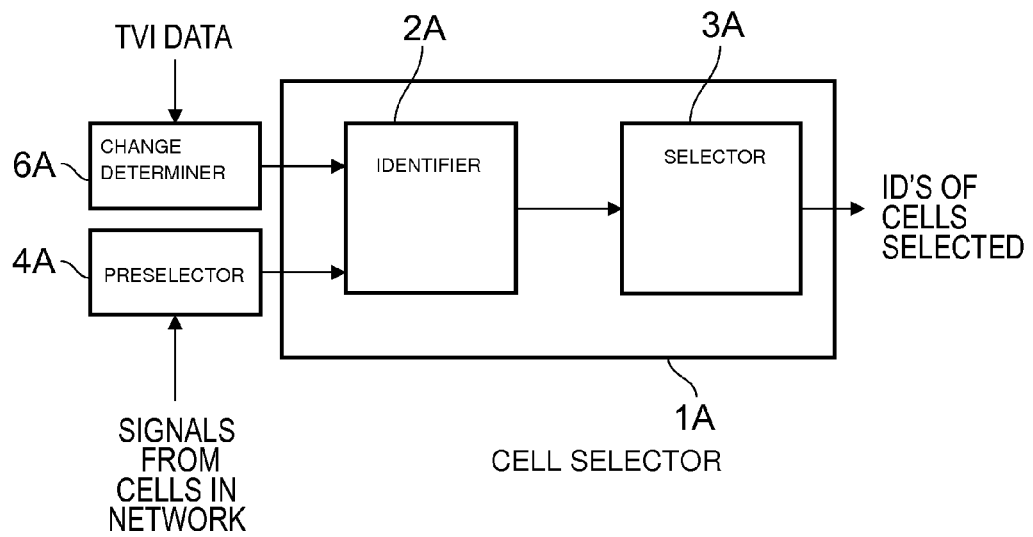
FIGS. 9A, 9B and 9C are diagrams illustrating apparatus embodying the present invention.

FIG. 9A shows apparatus which can be used to carry out a method embodying the present invention. The apparatus has cell selection means 1A which comprises identifying means 2A operable to identify a cell or subset of cells of a set for which the time variation rate/rates of a predetermined MIMO channel characteristic is/are the slowest of those of the cells in the said set. The cell selection means 1A further comprise selecting means 3A operable to select a cell or cells for use in multi-cell MIMO transmission from only the cell or subset of cells identified by the identifying means 2A.

The apparatus shown in FIG. 9A further comprises preselection means 4A operable to preselect cells of the network for inclusion in the said set of cells if signals received from the cells at a specific receiver are consistent with achieving a target coordination gain. The preselection means 4A may be omitted, or may be included in either the base station or preferably, to reduce signalling overhead, in the UE.

Figure 9B:
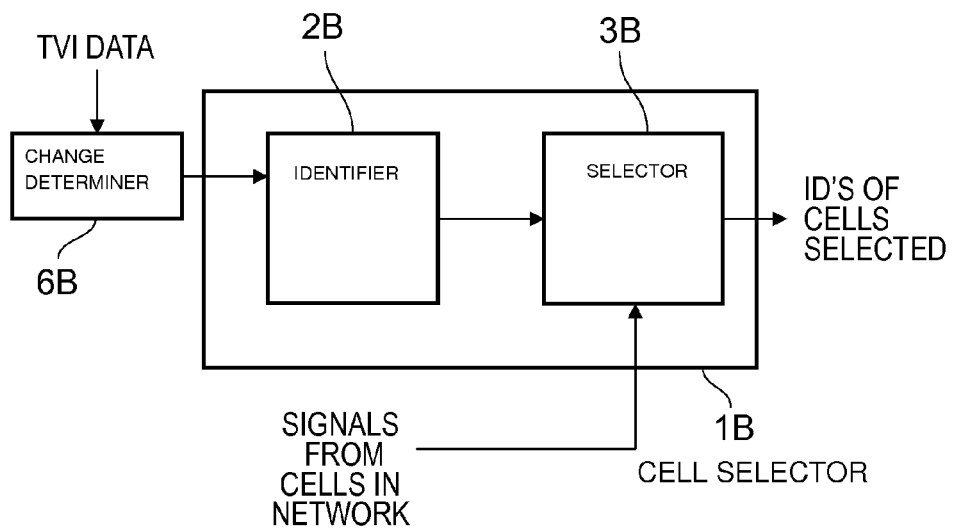

Alternative apparatus shown in FIG. 9B, which can be used to carry out another method embodying the present invention, differs from the apparatus of FIG. 9A in that the preselection means are omitted and identifying means 2B are operable to identify a cell or subset of cells having the slowest time variation rates of a predetermined MIMO channel characteristic from a set of cells which has not been preselected on the basis of achieving a target coordination gain. Instead, selecting means 3B of the cell selection means 1B are configured to select, from the subset of cells identified by the identifying means 2B, those cells for which signals received at a specific receiver from the cells are consistent with achieving a target coordination gain.

Figure 9C:
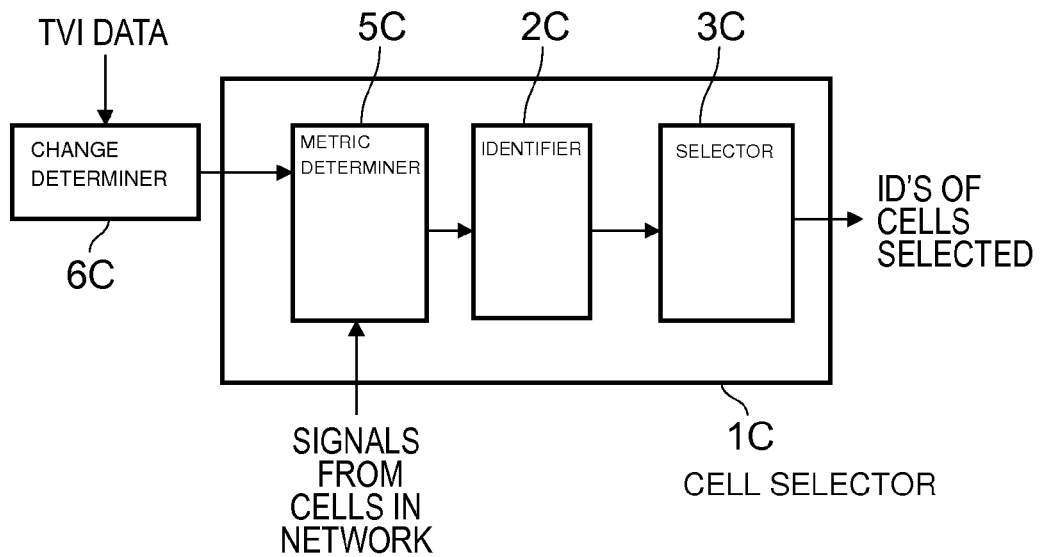

In another alternative apparatus shown in FIG. 9C, which can be used to carry out another method embodying the present invention, the apparatus comprises cell selection means 1C having metric determining means 5C for determining, for each cell in the said set, a metric which is dependent upon at least first and second parameters, the metric being high when the value of the first parameter is low and the value of the second parameter is high, the first parameter being the rate of variation with time of at least one MIMO channel characteristic of the cell concerned and the second parameter relating to a characteristic of signals received from the cell at a specific receiver. The characteristic to which the said second parameter relates is desirably a factor in achieving a target coordination gain. The apparatus further comprises identifying means 2C for identifying a cell or subset of cells of the said set for which the metric/metrics is/are highest of all the metrics determined for the cells of the said set, and selecting means 3C for selecting a cell or cells for use in multi-cell MIMO transmission from only the cell or subset of cells identified by the identifying means 2C.

The apparatus of FIGS. 9A, 9B and 9C additionally comprises change determining means 6A/6B/6C for determining, after the passage of an interval from the immediately-preceding selection of the cell or cells for use in the multi-cell MIMO transmission, whether the time variation rate/rates of the MIMO channel characteristic for a cell or any of the cells selected in the immediately-preceding cell selection process have changed by a preselected amount from the time variation rate/rates for that cell or those cells used in the preceding cell selection process, and, if such a change is determined to have occurred, the cell selection process is triggered.

In order to evaluate the performance of the proposed DCG method in reducing the feedback overhead during the operation of CoMP, the correlation matrix distance (CMD) metric is adopted as the main analysis tool. It is a system-independent measure of the spatial variation of MIMO channels. It allows the variation to be characterised by a single parameter, while it compares both the singular values and the subspaces of the matrices. Clearly the most important aspect for MIMO channels is the spatial structure of the system, e.g. when considering transmission beamforming, spatial multiplexing, etc., although the performance of MIMO systems also depends on the temporal and frequency behaviour of the channels. Therefore it has been proposed in EP09180243.9, filed on 21 Dec., 2009, that the CMD metric can be used to develop the proper feedback interval control scheme for CoMP operations.

The CMD metric was originally proposed, by M. Herdin, N. Czink, H. Ozcelik, and E. Bonek, in "Correlation matrix distance, a meaningful measure for evaluation of non-stationary MIMO channels", IEEE VTC spring 2005, vol. 1, 2005, pp. 136-140, for measuring the variation of the spatial structure of narrowband fast fading MIMO channels. In EP09180243.9, the CMD metric was extended for the wideband fast fading MIMO channels. For a certain frequency, the CMD between two instantaneous spatial correlation matrices was defined in EP09180243.9 as:

$$d_{corr}(R(t_1,f), R(t_2,f)) = 1 - \frac{tr\{R(t_1,f)R(t_2,f)\}}{\|R(t_1,f)\|_F \|R(t_2,f)\|_F} \in [0,1] \quad (1)$$

where tr(•) denotes matrix trace, $\|•\|_F$ denotes the Frobenius norm of a matrix, $R(t_1,f)$ and $R(t_2,f)$ are the spatial correlation matrices for a certain frequency at two different time samples $t_1$ and $t_2$, taking the receiver side spatial correlation as an example, the calculations of $R(t_1,f)$ and $R(t_2,f)$ are as follows:

$$R_{Rx}(t,f) = H(t,f)H^H(t,f) \quad (2)$$

where $H(t,f)$ is the $n_R \times n_T$ time-variant transfer matrix for the system with $n_R$ receiver antennas and $n_T$ transmitter antennas, which is obtained by applying Fourier transformation to the time-variant impulse response matrix $H(t,\tau)$. In equation (1), if $R(t_1,f)$ and $R(t_2,f)$ are identical, then the CMD is zero; while if they vary radically, it will tend to one. Since $d_{corr}$ characterizes the variation between two instantaneous spatial correlation matrices, which are calculated based on two instantaneous channel matrices respectively, $d_{corr}$ can indicate the change in the instantaneous channel matrix.

In the following, the CMD metric introduced above together with the 3GPP spatial channel model (SCM) (see 3GPP TR 25.996: "Spatial channel model for multiple input multiple output (MIMO) simulations", V8.0.0, 2008-12) are used to evaluate the performance of the proposed DCG method in reducing the feedback overhead needed during the operation of CoMP. The whole simulation process for the evaluation mainly consists of four functionality parts, which are the generation of channel matrix part, generation of TVI reports part, cell grouping part, and investigation on the feedback overhead reduction part.

Figure 3:
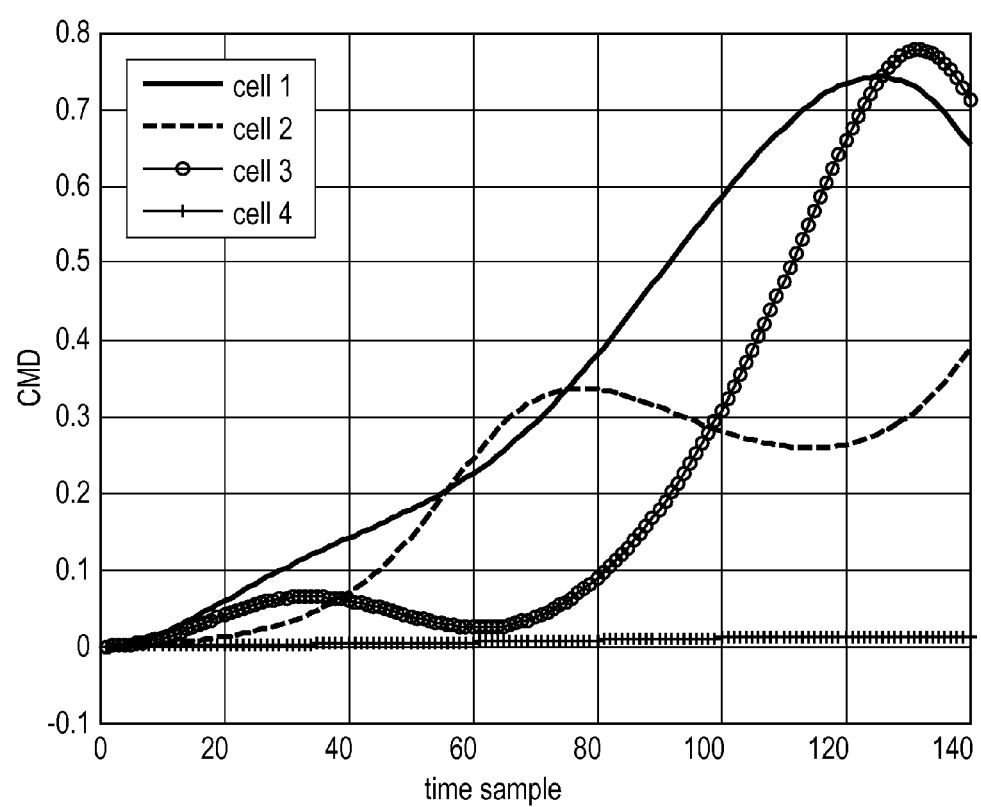
FIG. 3 is a graph showing the correlation matrix distances (CMDs) of four different cells in a simulation of a method embodying the present invention.

To be specific, each part is introduced as follows:
1) Generation of channel matrix:
The 3GPP spatial channel model (SCM) is used to simulate the time-variant multi-cell MIMO channels. Specially, the urban macro scenario specified in 3GPP TR 25.996 is adopted in the simulations. Assuming each cell is hexagonal with 3 sectors per cell, the impulse response matrices at different time samples between the UE and each of the transmitting sectors are generated. Uniform linear arrays (ULAs) are used at the UE and at each transmitting sector with 2 antennas at the UE side and 8 antennas at the transmitter side. At the beginning of each simulation run, the position of the UE, the antenna orientation of the UE, the velocity and direction of the UE's movement, and the orientations of the antennas at different transmitting sectors are defined and assumed to be constants during the simulation period. The time interval between two neighbouring time samples is 1 ms, which corresponds to one subframe period in LTE systems. At each time sample, a series of impulse response channel matrices between the UE and each transmitting sector is generated, i.e. $H(t,\tau)$, and then they are transformed to a series of transfer matrices by Fourier transformation, i.e. $H(t,f)$, which thereby can be used in equation (1) and (2) to measure the time variation of MIMO channels for a certain frequency f within each transmitting sector individually. Since Doppler spectrums for the same UE with respect to different transmitting sectors are in general dissimilar, the channels associated with different transmitting sectors are expected to undergo unequal time variations. FIG. 3 shows the simulation results of the CMDs for 4 different transmitting sectors with the velocity of UE being 3 km/h and the total simulation time period being 140 ms. Note that, in all the simulations, the receiver side spatial correlation matrix is used to generate the CMDs, and subsequently the term cell is used to describe individual sectors.

2) Generation of TVI reports:

During the UE measuring time as illustrated in FIG. 2, the time variation rates of the MIMO channels in different cells are measured by the UE. In order to measure the time variation rate of a certain cell based on the extended CMD metric, one possible method is to record the number of times that the CMD crosses a predefined threshold $\alpha$, the more times the CMD crosses $\alpha$ during the UE measuring time, the higher the time variation rate of the cell is considered to be. So for each cell, if the spatial correlation matrix at time $t_0$ $R(t_0,f)$ is taken as reference, and then the CMDs for the subsequent time instants can be calculated by using equation (1) and the spatial correlation matrix at each time instant is $R(t,f)$. Once the CMD has crossed $\alpha$, the reference spatial correlation matrix will be set to the current spatial correlation matrix, i.e. $R(t_0,f)=R(t,f)$, and the CMD will be reset to zero.

Taking the 3 km/h mobility scenario as an example, the UE measuring time is specified as 20 ms, and $\alpha$ is defined as 0.001. The value of $\alpha$ is configured based on two factors. One is the system requirement on the resolution for grading the time variation rate, the other is the mobility scenario. Generally speaking, the smaller the value of $\alpha$ is, the higher the resolution is for grading the time variation rate. However, for the medium mobility scenarios, such as velocity of UE being 30 km/h, the value of $\alpha$ should not be set too small. This is because the time variation of channels is much quicker and larger between adjacent time samples, if the value of $\alpha$ is too small, the CMDs of different cells can always pass the threshold easily no matter whether the cell is relatively slowly time-varying or fast time-varying, thus it is not able to differentiate the time variation rates of different cells during the UE measuring time period.

By using the same simulation settings as those for FIG. 3, the number of crossing instances for each cell during the first 20 ms period is recorded respectively, and we find that these numbers are 6, 3, 6 and 1 for cell 1, cell 2, cell 3 and cell 4 respectively. According to these numbers, the time variation rates of these four cells are graded as "high", "medium low", "high" and "low" individually. The grading method used here is that the smallest and largest numbers are taken as the lower bound and upper bound respectively, which are termed "low" and "high" time-varying cells correspondingly, and between them there are another two levels, depending on whether the number is closer to the lower bound or to the upper bound, which are "medium-low" and "medium-high" correspondingly. For the four levels of time variation rate, the UE requires 2 bits to represent the TVI for each cell, which will be reported to the serving BS and used as cell grouping references. The UE repeats the measuring procedure every 60 ms and every measuring procedure lasts for 20 ms as those illustrated in FIG. 2, since the channel coherence time is approximately 80 ms for the 3 km/h mobility scenario. Therefore, after 60 ms from the first measuring time point, the UE measures the time variation rates of the four cells again by using the same method, and we find that during the second measuring time, the crossing instances for cell 1, 2, 3 and 4 are 5, 4, 6 and 1 individually, which are thereby classified as "medium-high", "medium-high", "high" and "low" time-varying cells correspondingly. The UE again reports these TVIs to the BS and the BS can then use this information to judge whether it needs carry out regrouping or not. Table 1 shows the grading results of the time variation rates for 4 different cells in two adjacent measuring time periods.

TABLE 1

Grading results for two adjacent measuring time periods

| | Cell 1 | Cell 2 | Cell 3 | Cell 4 |
|---|---|---|---|---|
| $1^{st}$ measuring time | high | medium-low | high | low |
| $2^{nd}$ measuring time | medium-high | medium-high | high | low |

3) Cell grouping:

At the BS, the proposed DCG method is employed based on the TVI reports from the UE provided that there exist multiple candidate cells that can provide a certain CoMP gain. In the simulation, it is assumed that cell 2 is the serving cell that can provide the highest average received signal power, and it can be grouped with either cell 3 or cell 4 to meet the target transmission gains. Thus based on the first TVI reports received from the UE (see Table 1), the BS groups cell 4 with cell 2 for the subsequent CoMP transmission according to the proposed DCG method. After the BS receives the second TVI reports from the UE, since TVI of cell 4 still denotes "low" time-varying, the BS doesn't need perform regrouping process but can keep using the grouping of cell 4 and cell 2 for the subsequent data transmission.

4) Investigation on the feedback overhead reduction:

Based on the grouping decisions made by the BS, the feedback interval control (FIC) scheme proposed in EP09180243.9 is adopted to investigate the feedback overhead during the operation of CoMP. Here, first of all, the FIC scheme of EP09180243.9 is briefly introduced. Subsequently simulation results are presented based on which the issue of whether the feedback overhead can be reduced by using the proposed DCG method is investigated.

The FIC scheme proposed in EP09180243.9 is a CMD-based adaptive FIC scheme. To use it, there are two parameters which need to be specified, which are the transmission mode indicator β and feedback CMD threshold γ. The transmission mode indicator is used to choose the proper kind of channel matrix to be used in the CMD metric. The feedback CMD threshold is applied to the CMD metric to adaptively control the feedback interval for the specified transmission mode.

Specifically, for the CoMP joint processing (JP) with global precoding transmission mode, $H_{cat}=[H^{(1)}H^{(2)} \ldots H^{(B)}]$ is the channel matrix to be used in the CMD metric to control the feedback interval, where B is the number of JP cells, $H^{(b)}$ b= 1 ... B is the $n_R \times n_T$ matrix between cell b and the UE and the size of $H_{cat}$ is $n_R \times Bn_T$. For the CoMP JP with MBSFN precoding transmission mode $$H_{sum} = \sum_{b=1}^{B} H^{(b)}$$

is used in the CMD metric, where $H_{sum}$ is the added up channel matrix with dimensions being $n_R \times n_T$ assuming $n_T$ transmitter antennas in each cell. For the CoMP JP with local precoding or weighted local precoding transmission mode and CoMP CB transmission mode, the channel matrix of each cooperative cell $H^{(b)}$ is used in the CMD metric (see EP09180243.9 and R1-090022, "Considerations on precoding scheme for DL joint processing CoMP", Sharp, 3GPP TSG-RAN WG1 #55bis, 12-16 Jan. 2009, Ljubljana, Slovenia).

Regarding the CMD-based adaptive FIC method, it includes the following steps:

a) at time $t_0$, the initial channel information of each cooperating cell is fed back to the network and the spatial correlation matrix at time $t_0$ is taken as reference, where the spatial correlation matrix has different calculation means associated with different CoMP transmission modes, and then the subsequent CMDs are calculated using equation (1);

b) the CMDs at different time samples are compared with the predefined feedback threshold γ: in the case of CoMP JP with global precoding or CoMP JP with MBSFN precoding transmission mode, if the CMD of the composite channel matrix, i.e. $H_{cat}$ or $H_{sum}$, is larger or equal to γ at time t, then the channel information for all the cooperating cells is updated by feeding back, meanwhile the reference spatial correlation matrix calculated by using the composite channel matrix is updated to the correlation matrix at time t; in the case of CoMP JP with local precoding or weighted local precoding transmission mode and CoMP CB transmission mode, if the CMDs of any cooperating cells are larger or equal to γ at time t, then the channel information for those cells is updated by feeding back, meanwhile the reference spatial correlation matrices of those cells are updated to their correlation matrices at time t;

c) procedures a) and b) are repeated.

Figure 4:
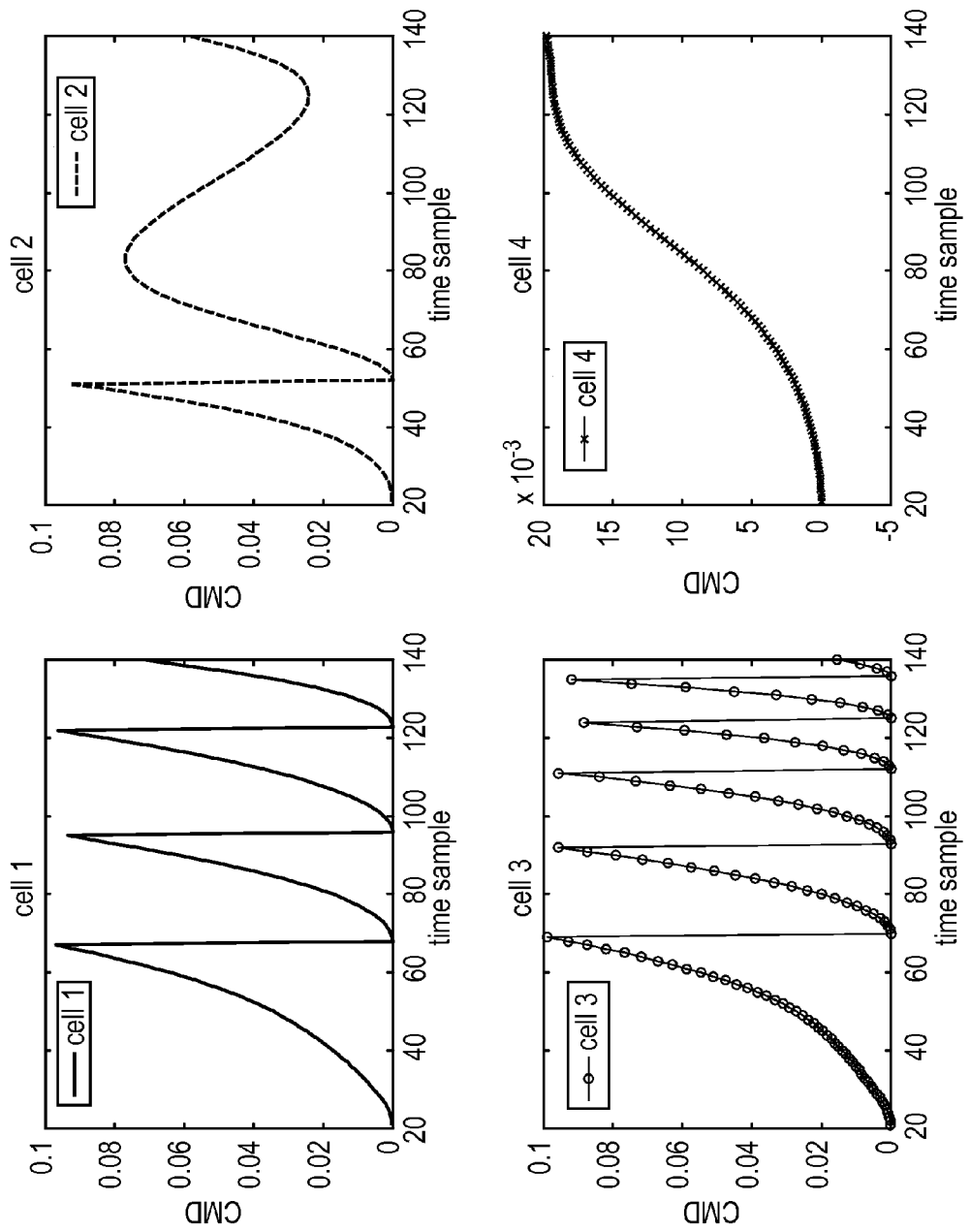
FIG. 4 is a graph showing simulation results of feedback instances for four different cells.
Figure 5:
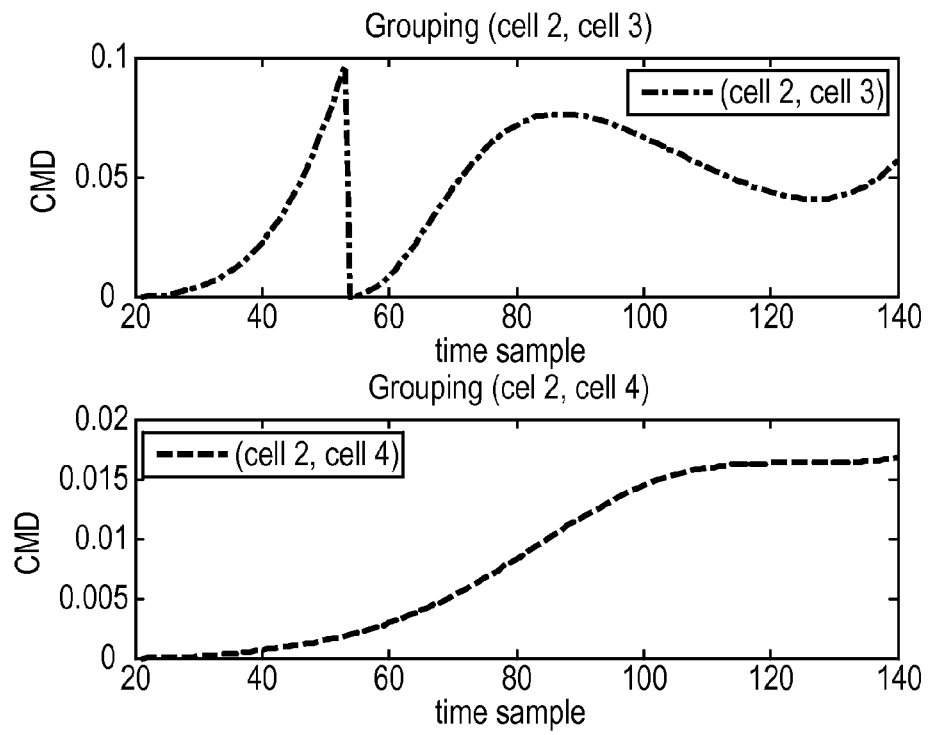
FIGS. 5 and 6 are graphs for use in comparing feedback instances of different two-cell groupings in a simulation of a method embodying the present invention.
Figure 6:
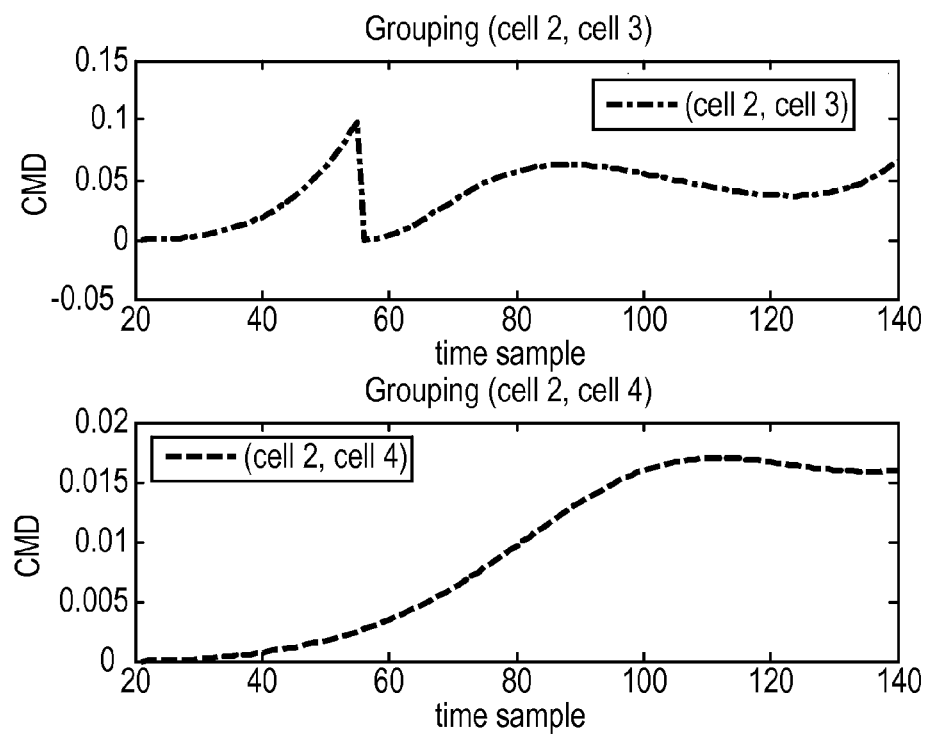

In the following the simulation results of the feedback instances based on the grouping decisions made by the BS are shown for the data transmission period between 21 ms and 140 ms. At the beginning of this data transmission period, the grouping decision is based on the first UE TVI reports (see Table 1). During the time period of 21 ms to 140 ms, since UE reports TVIs of the potentially cooperating cells every 60 ms, it allows the BS to regroup the cells that are active to join the coordination if needed. In this particular simulation, by using the proposed DCG method and the TVI reports given by the UE (see Table 1), we can find that the BS utilizes the grouping of cell 2 and cell 4 all the time during the data transmission period of 21 ms to 140 ms, so there is no need for the BS to regroup the cells. Therefore, comparisons of the performance in feedback overhead by using the proposed grouping and the non-suggested grouping are shown in FIG. 4 to FIG. 6 corresponding to various CoMP transmission modes. In the case that BS need regroup the cells during data transmission, after regrouping, BS need inform the UE of the new grouping, and thus the UE can feed back channel information corresponding to the new grouping. Meanwhile UE reset the CMD as zero at the regrouping time, and also reset the reference spatial correlation matrix (matrices) as that (those) at the regrouping time.

In these simulations, the feedback CMD threshold γ is set as 0.1, and the velocity of UE is 3 km/h. The choice of γ needs the comprehensive consideration of the requirement on system performance and feedback overhead. Here, for the purpose of demonstration, the value of 0.1 is chosen as it will not lead to degradation of the system performance in terms of capacity or block error rate (BLER).

From FIG. 4, we can see that, for the CoMP transmission modes such as CoMP JP with local or weighted local precoding and CoMP CB, the total number of instances (i.e. messages) for cell 2 and cell 3 is 8, but that for cell 2 and cell 4 is 2, which results in a feedback overhead reduction of 75% by using the proposed grouping method compared to the grouping with "high" time-varying cell.

FIG. 5 shows that, for the transmission mode being JP with global precoding, by using the grouping of cell 2 and cell 3 (which means that $H_{cat}$ is composed of the channel information of cell 2 and cell 3), the number of feedback instances is 2, corresponding to 4 feedback messages and it is 1 by using the grouping of cell 2 and cell 4 (which means that $H_{cat}$ is composed of the channel information of cell 2 and cell 4), corresponding to 2 feedback messages. Therefore, the feedback overhead is reduced by 50%.

FIG. 6 shows the simulation results of feedback instances obtained from using different cell groupings assuming the transmission mode being CoMP JP with MBSFN precoding. For this transmission mode, $H_{sum}$ that has different compositions according to different groupings is used in the CMD metric to determine the feedback instances. Similarly, the simulation results shown in FIG. 6 imply that the proposed cell grouping method results in the feedback overhead reduction by 50%.

Figure 7:
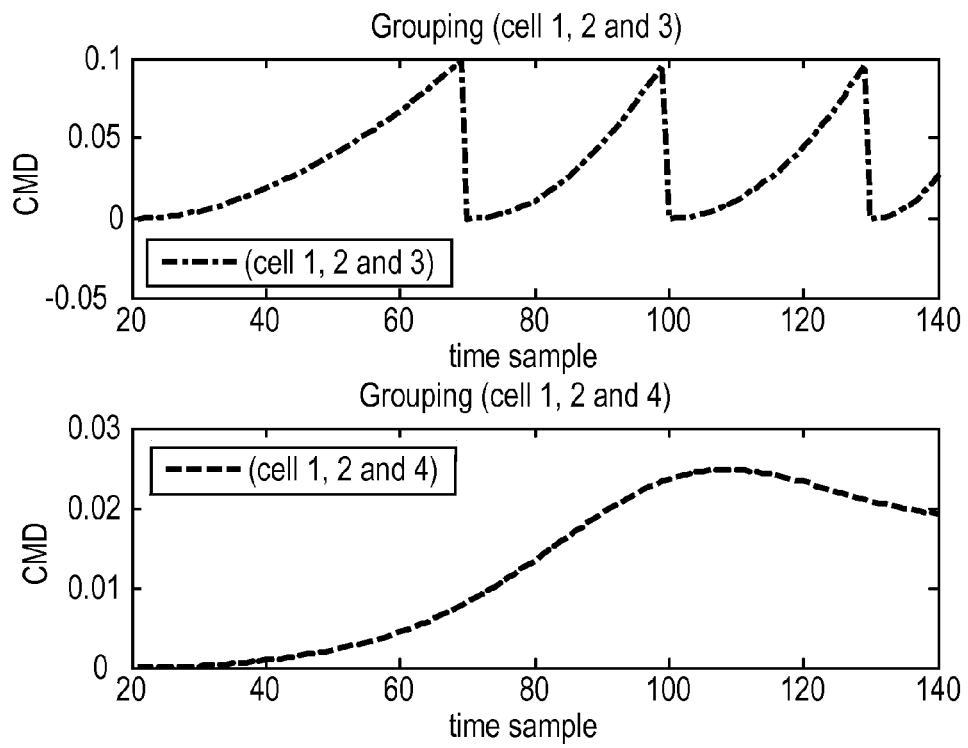
FIGS. 7 and 8 are graphs for use in comparing feedback instances of different three-cell groupings in a simulation of a method embodying the present invention.
Figure 8:
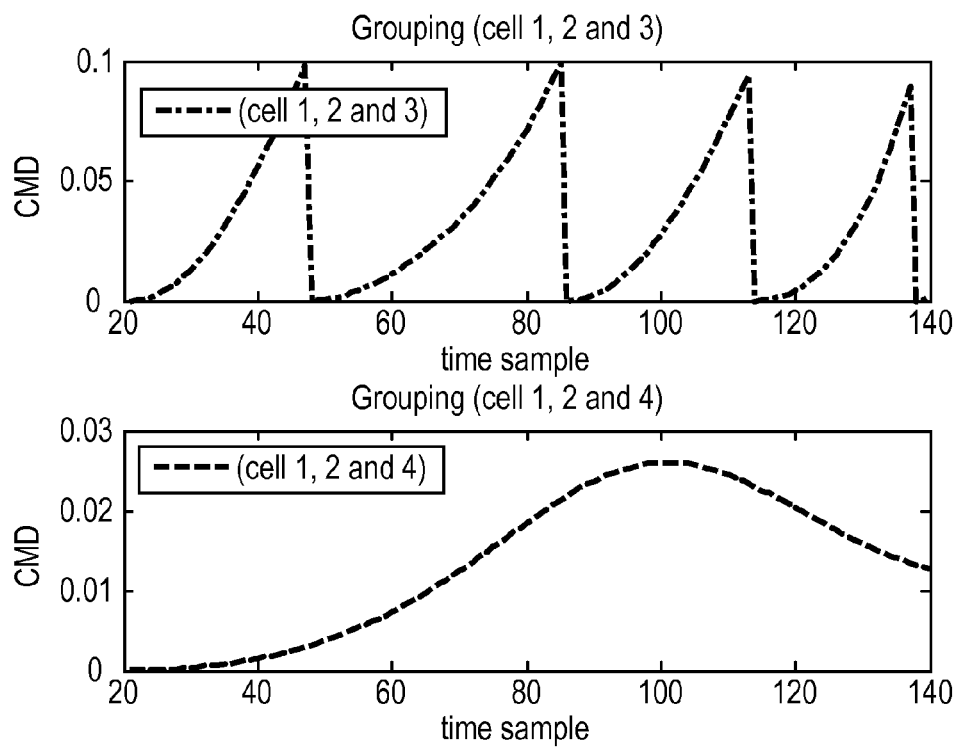

FIGS. 5 and 6 have shown the simulation results of feedback instances when the number of active cells to join coordination is 2. When the number of active cells to join coordination is larger than two, the performance in reducing feedback overhead by the proposed cell grouping method is evaluated in various CoMP transmission scenarios. For example, for the simulation results shown in FIG. 4, if we still assume cell 2 the serving cell, additionally cell 1 is selected as one active cell to join coordination since it is the only cell that can provide a certain CoMP gain, then by grouping cell 1 and cell 2 with cell 4 ("low" time-varying cell) rather than with cell 3 ("high" time-varying cell), in the case of CoMP JP with local or weighted local precoding and CoMP CB transmission modes, the feedback overhead can be reduced by 42% according to FIG. 4; in the case of CoMP with global precoding, FIG. 7 shows that the reduction in feedback overhead is 75%, and in the case of MBSFN precoding, FIG. 8 shows that the reduction in feedback overhead is 80% during the period of 21 ms to 140 ms. Therefore the proposed cell grouping method can be generally applied to the situations where the number of active cells to join coordination is larger than two.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality described above.

The invention may also be embodied as one or more device or apparatus programs (e.g. computer programs and computer program products) for carrying out part or all of the methods described herein. Such programs embodying the present invention may be stored on computer-readable media, or could, for example, be in the form of one or more signals. Such signals may be data signals downloadable from an Internet website, or provided on a carrier signal, or in any other form.

It will be appreciated that embodiments of the present invention can be applied to any multi-cell MIMO system.

What is claimed is:

1. A method for use in selecting a cell or cells, from amongst a set of cells in a cellular wireless network, for coordinated use in multi-cell multiple-input/multiple-output (MIMO) transmission so as to reduce feedback overhead, each cell of the set of cells having at least one MIMO channel characteristic which can vary with time at a measurable rate, the method comprising a cell selection process comprising:
   identifying the cell or subset of cells of the set of cells for which time variation rate or rates of the at least one MIMO channel characteristic is slowest of the cells in the set of cells; and
   selecting the cell or cells for use in the multi-cell MIMO transmission from only the cell or subset of cells identified;
   wherein a preselection process is carried out before the identifying, in which process cells of the cellular wireless network are preselected for inclusion in the set of cells if signals received from the cells at a specific receiver are consistent with achieving a target coordination gain; and
   the method further comprising carrying out, after passage of an interval from the selection of the cell or cells for use in the multi-cell MIMO transmission of an immediately-preceding cell selection process, an updating process of:
   determining whether the time variation rate or rates of the at least one MIMO channel characteristic for a cell or any of the cells selected in the immediately-preceding cell selection process have changed by a preselected amount from the time variation rate or rates used in the immediately-preceding cell selection process for the selected cell or cells;
   if such a change is determined to have occurred, repeating the preselection process; and
   if a set of cells can be preselected in the preselection process, repeating the cell selection process.

2. A method for use in selecting a cell or cells, from amongst a set of cells in a cellular wireless network, for coordinated use in multi-cell multiple-input/multiple-output (MIMO) transmission to reduce feedback overhead, each cell of the set of cells having at least one MIMO channel characteristic which can vary with time at a measurable rate, the method comprising a cell selection process comprising:
   determining, for each cell in the set of cells, a metric which is dependent upon at least first and second parameters, the metric being high when a value of the first parameter is low and a value of the second parameter is high, the first parameter being a rate of variation with time of at least one MIMO channel characteristic of the cell concerned and the second parameter relating to a characteristic of signals received from the cell at a specific receiver;
   identifying a cell or subset of cells of the set of cells for which the metric or metrics of the cell or cells is or are highest of all the metrics determined for the cells of the set of cells; and
   selecting the cell or cells for use in the multi-cell MIMO transmission from only the cell or subset of cells identified; and
   the method further comprising carrying out, after passage of an interval from the selection of the cell or cells for use in the multi-cell MIMO transmission of an immediately-preceding cell selection process, an updating process of:
   determining whether the time variation rate or rates of the at least one MIMO channel characteristic for the cell or any of the cells selected in the immediately-preceding cell selection process have changed by a preselected amount from the time variation rate or rates used in the immediately-preceding cell selection process for the selected cell or cells, and,
   if such a change is determined to have occurred, repeating the cell selection process.

3. The method as claimed in claim 2, wherein the characteristic to which the said second parameter relates is a factor in achieving a target coordination gain.

4. An apparatus for use in a communication system for a cellular wireless network, the apparatus being operable to carry out a cell selection process for use in selecting a cell or cells, from amongst a set of cells in the cellular wireless network, for coordinated use in multi-cell multiple-input/multiple-output (MIMO) transmission so as to reduce feedback overhead, each cell of the set of cells having at least one MIMO channel characteristic which can vary with time at a measurable rate, the cell selection process being carried out by a cell selection module of the apparatus having:
   an identifying module operable to identify a cell or subset of cells of the set of cells for which a time variation rate or rates of the at least one MIMO channel characteristic is or are slowest of those of the cells in the set of cells; and
   a selecting module operable to select the cell or cells for use in the multi-cell MIMO transmission from only the cell or subset of cells identified by the identifying module;
   the apparatus further comprising:
   a preselection module operable to preselect cells of the cellular wireless network for inclusion in the set of cells if signals received from the cells at a specific receiver are consistent with achieving a target coordination gain; and
   a change determining module operable, after passage of an interval from an immediately-preceding selection of the cell or cells for use in the multi-cell MIMO transmission, to:
   determine whether the time variation rate or rates of the at least one MIMO channel characteristic for the cell or any of the cells selected in the immediately-preceding cell selection process have changed by a preselected amount from the time variation rate or rates used in the immediately-preceding cell selection process for the selected cell or cells; and if such a change is determined to have occurred, and a set of cells can be preselected by the preselection module, cause the cell selection process to be repeated.

5. The apparatus as claimed in claim 4, wherein the cellular wireless network is a 3GPP network.

6. The apparatus of claim 4 comprised in a communication system for a cellular wireless network.

7. The apparatus as claimed in claim 6, wherein the communication system further comprises user equipment operable to supply to the apparatus data indicative of the time variation rate or rates of the at least one MIMO channel characteristic for at least the cell or cells in the set of cells.

8. The apparatus as claimed in claim 7, wherein the user equipment is operable to supply the data to the apparatus in response to a trigger from the apparatus.

9. The apparatus as claimed in claim 7, wherein the user equipment is operable to supply the data to the apparatus when the time variation rate of the at least one MIMO channel characteristic for the cell, or at least one of the cells, in the set of cells reaches a predefined threshold value.

10. The apparatus of claim 4 comprised in a communication system for a cellular wireless network and user equipment operable to supply to the apparatus data indicative of the time variation rate or rates of the at least one MIMO channel characteristic for at least the cell or cells in the set of cells, wherein the user equipment is operable to supply the data to the apparatus at periodic intervals.

11. The apparatus as claimed in claim 10, wherein the user equipment is operable to supply the data to the apparatus in response to a trigger from the apparatus and the apparatus is operable to notify the user equipment of the periodicity of the intervals at which the data is to be supplied when providing the trigger.

12. An apparatus for use in a communication system for a cellular wireless network, the system being operable to carry out a cell selection process for use in selecting a cell or cells, from amongst a set of cells in the cellular wireless network, for coordinated use in multi-cell multiple-input/multiple-output (MIMO) transmission so as to reduce feedback overhead, each cell of the set of cells having at least one MIMO channel characteristic which can vary with time at a measurable rate, the cell selection process being carried out by a cell selection module of the apparatus having:
 a metric determining module for determining, for each cell in the set of cells, a metric which is dependent upon at least first and second parameters, the metric being high when a value of the first parameter is low and a value of the second parameter is high, the first parameter being a rate of variation with time of at least one MIMO channel characteristic of the cell concerned and the second parameter relating to a characteristic of signals received from the cell at a specific receiver;
 an identifying module for identifying a cell or subset of cells of the set of cells for which the metric or metrics of the cell or cells is or are highest of all the metrics determined for the cells of the set of cells; and
 a selecting module for selecting the cell or cells for use in the multi-cell MIMO transmission from only the cell or subset of cells identified by the identifying module;
 the apparatus further comprising a change determining module operable, after passage of an interval from an immediately-preceding selection of the cell or cells for use in the multi-cell MIMO transmission, to determine whether the time variation rate or rates of the at least one MIMO channel characteristic for the cell or any of the cells selected in the immediately-preceding cell selection process have changed by a preselected amount from the time variation rate or rates used in the immediately-preceding cell selection process for the selected cell or cells, and, if such a change is determined to have occurred, causing the cell selection process to be repeated.

13. The apparatus as claimed in claim 12, wherein the characteristic to which the second parameter relates is a factor in achieving a target coordination gain.

14. The apparatus as claimed in claim 12, wherein the cellular wireless network is a 3GPP network.

15. The apparatus of claim 12 comprised in a communication system for a cellular wireless network.

16. The apparatus as claimed in claim 15, wherein the communication system further comprises user equipment operable to supply to the apparatus data indicative of the time variation rate or rates of the at least one MIMO channel characteristic for at least the cell or cells in the set of cells.

17. The apparatus as claimed in claim 16, wherein the user equipment is operable to supply the data to the apparatus in response to a trigger from the apparatus.

18. The apparatus as claimed in claim 16, wherein the user equipment is operable to supply the data to the apparatus when the time variation rate of the at least one MIMO channel characteristic for the cell, or at least one of the cells, in the set of cells reaches a predefined threshold value.

19. The apparatus of claim 12 comprised in a communication system for a cellular wireless network and user equipment operable to supply to the apparatus data indicative of the time variation rate or rates of the at least one MIMO channel characteristic for at least the cell or cells in the set of cells, wherein the user equipment is operable to supply the data to the apparatus at periodic intervals.

20. The apparatus as claimed in claim 19, wherein the user equipment is operable to supply the data to the apparatus in response to a trigger from the apparatus and the apparatus is operable to notify the user equipment of the periodicity of the intervals at which the data is to be supplied when providing the trigger.

21. An apparatus for use in a communication system for a cellular wireless network, the apparatus being operable to carry out a cell selection process for use in selecting a cell or cells, from amongst a set of cells in the cellular wireless network, for coordinated use in multi-cell multiple-input/multiple-output (MIMO) transmission so as to reduce feedback overhead, each cell of the set of cells having at least one MIMO channel characteristic which can vary with time at a measurable rate, the cell selection process being carried out by a cell selection module of the apparatus having:
 an identifying module operable to identify a cell or subset of cells of the set of cells for which a time variation rate or rates of the at least one MIMO channel characteristic is or are slowest of those of the cells in the set of cells; and
 a selecting module operable to select the cell or cells for use in the multi-cell MIMO transmission from only the cell or subset of cells identified by the identifying module;
 the apparatus further comprising a change determining module operable, after passage of an interval from an immediately-preceding selection of the cell or cells for use in the multi-cell MIMO transmission, to determine whether the time variation rate or rates of the at least one MIMO channel characteristic for a cell or any of the cells selected in the immediately-preceding cell selection process have changed by a preselected amount from the time variation rate or rates used in the immediately-preceding cell selection process for the selected cell or cells, and, if such a change is determined to have occurred, causing the cell selection process to be repeated.

22. The apparatus as claimed in claim 21, wherein the cellular wireless network is a 3GPP network.

23. The apparatus of claim 21 comprised in a communication system for a cellular wireless network.

24. The apparatus as claimed in claim 23, wherein the communication system further comprises user equipment operable to supply to the apparatus data indicative of the time variation rate or rates of the at least one MIMO channel characteristic for at least the cell or cells in the set of cells.

25. The apparatus as claimed in claim 24, wherein the user equipment is operable to supply the data to the apparatus in response to a trigger from the apparatus.

26. The apparatus as claimed in claim 24, wherein the user equipment is operable to supply the data to the apparatus when the time variation rate of the at least one MIMO channel characteristic for the cell, or at least one of the cells, in the set of cells reaches a predefined threshold value.

27. The apparatus of claim 21 comprised in a communication system for a cellular wireless network and user equipment operable to supply to the apparatus data indicative of the time variation rate or rates of the at least one MIMO channel characteristic for at least the cell or cells in the set of cells, wherein the user equipment is operable to supply the data to the apparatus at periodic intervals.

28. The apparatus as claimed in claim 27, wherein the user equipment is operable to supply the data to the apparatus in response to a trigger from the apparatus and the apparatus is operable to notify the user equipment of the periodicity of the intervals at which the data is to be supplied when providing the trigger.

29. The apparatus as claimed in claim 21, wherein the selecting module is operable, where the subset of cells is identified by the identifying module, to select the cell or cells of the subset of cells for use in multi-cell MIMO transmission for which signals received from the cell or cells at a specific receiver are consistent with achieving a target coordination gain.

30. A method for use in selecting a cell or cells, from amongst a set of cells in a cellular wireless network, for coordinated use in multi-cell multiple-input/multiple-output (MIMO) transmission so as to reduce feedback overhead, each cell of the set of cells having at least one MIMO channel characteristic which can vary with time at a measurable rate, the method comprising a cell selection process comprising:
  identifying the cell or subset of cells of the set of cells for which time variation rate or rates of the at least one MIMO channel characteristic is slowest of the cells in the set of cells; and
  selecting the cell or cells for use in the multi-cell MIMO transmission from only the cell or subset of cells identified; and
  the method further comprising carrying out, after passage of an interval from the selection of the cell or cells for use in the multi-cell MIMO transmission of an immediately-preceding cell selection process, an updating process of:
  determining whether the time variation rate or rates of the at least one MIMO channel characteristic for the cell or any of the cells selected in the immediately-preceding cell selection process have changed by a preselected amount from the time variation rate or rates used in the immediately-preceding cell selection process for the selected cell or cells, and,
  if such a change is determined to have occurred, repeating the cell selection process.

31. The method as claimed in claim 30, further comprising, where the subset of cells is identified, selecting the cell or cells of the subset of cells for use in the multi-cell MIMO transmission for which signals received from the cell or cells at a specific receiver are consistent with achieving a target coordination gain.

32. A non-transitory computer-readable medium storing a computer program which, when executed in an apparatus of a cellular wireless network, is operable to carry out a method as claimed in claim 1.

33. A non-transitory computer-readable medium storing a computer program which, when executed in an apparatus of a cellular wireless network, is operable to carry out a method as claimed in claim 30.

34. A non-transitory computer-readable medium storing a computer program which, when executed in an apparatus of a cellular wireless network, is operable to carry out a method as claimed in claim 2.

* * * * *